March 9, 1948. L. COOKLIN ET AL 2,437,380
COLLAPSIBLE CARRIAGE
Filed Aug. 23, 1945 6 Sheets-Sheet 1

March 9, 1948. L. COOKLIN ET AL 2,437,380
COLLAPSIBLE CARRIAGE
Filed Aug. 23, 1945 6 Sheets-Sheet 2

March 9, 1948. L. COOKLIN ET AL 2,437,380
COLLAPSIBLE CARRIAGE
Filed Aug. 23, 1945 6 Sheets-Sheet 3

March 9, 1948. L. COOKLIN ET AL 2,437,380
COLLAPSIBLE CARRIAGE
Filed Aug. 23, 1945 6 Sheets-Sheet 4

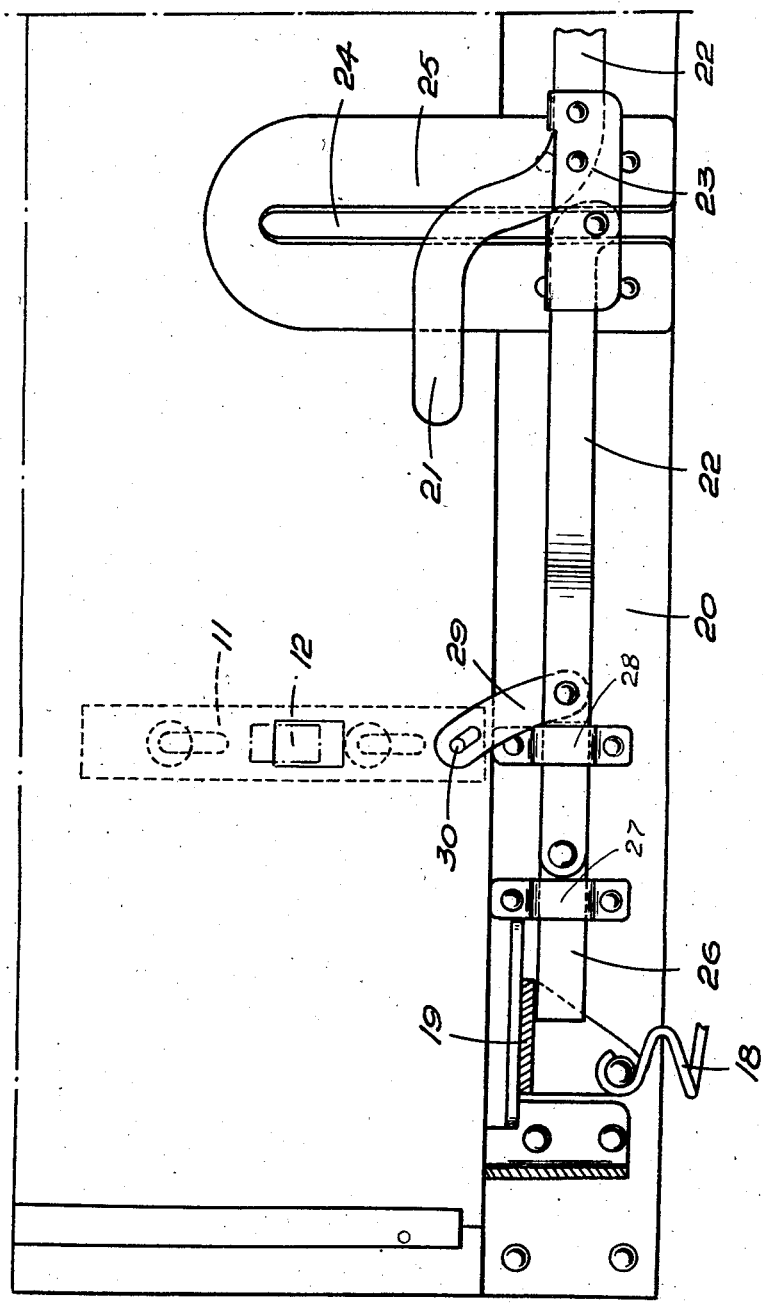

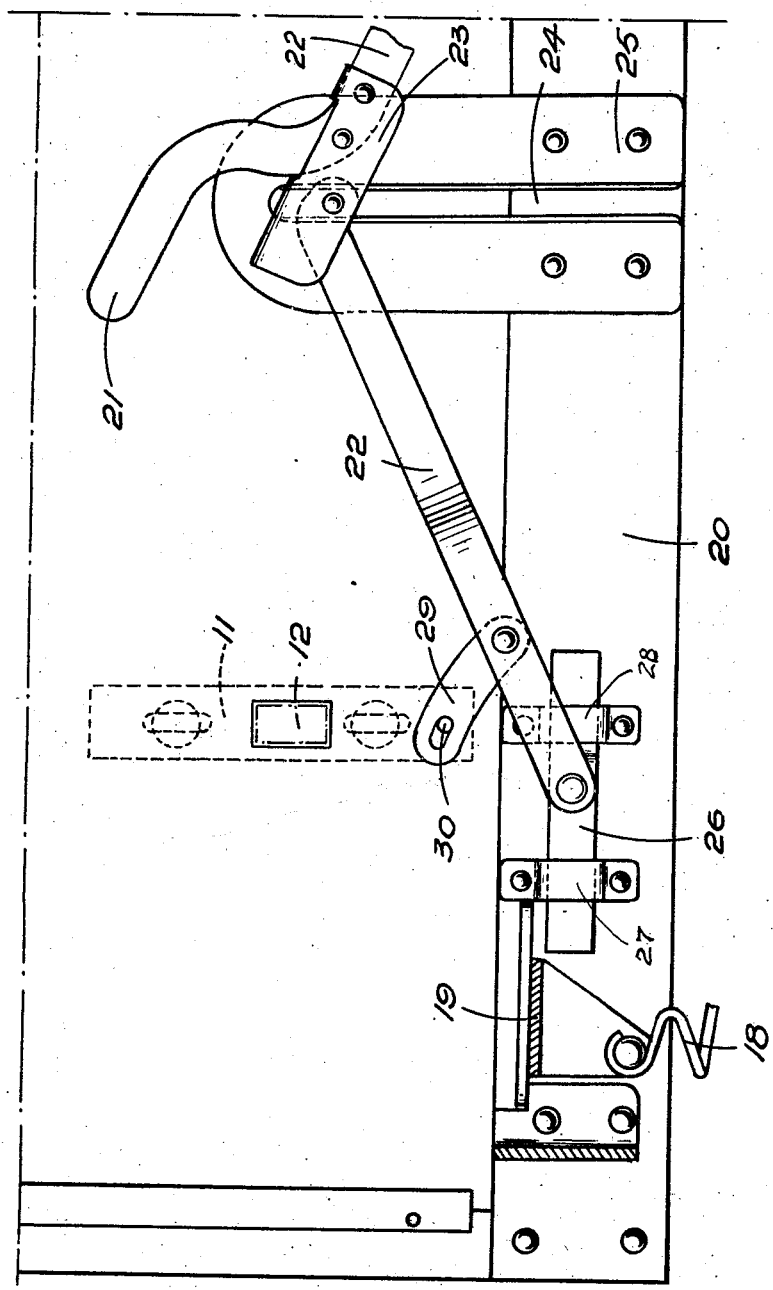

Patented Mar. 9, 1948

2,437,380

UNITED STATES PATENT OFFICE 2,437,380

COLLAPSIBLE CARRIAGE

Leonard Cooklin and Thomas Roy Hollis, Birmingham, England, assignors to Charles Twigg & Company Limited, Birmingham, England, a British company Application August 23, 1945, Serial No. 612,148
In Great Britain September 12, 1944

10 Claims. (Cl. 280—37)

1

This invention relates to a collapsible carriage which, when not in use, is capable of forming a portable case and is particularly applicable to a children's or baby carriage capable of being collapsed into the form of a suit or travelling case in a new or improved manner.

According to the invention in one of its aspects, the road wheels for supporting opposite sides of such a carriage are so mounted on the carriage that they are adapted to be swung away from one another and downwardly to allow the wheels to be brought into operative position.

According to the invention in another aspect, the road wheels are mounted on panels which panels are adapted to be applied to opposite sides of the carriage to allow the wheels to be brought into operative position.

The wheels may in either case be carried on chassis units, one or more on each unit, which units are adapted to be moved relatively to the parts of the carriage on which they are mounted as by swinging or sliding relatively thereto, to bring the wheels into operative position.

According to the invention in a still further aspect, the road wheels for supporting opposite sides of the carriage are adapted to be swung about axes on the said sides respectively, each of which axes is itself adapted to be swung about a second axis on its own side of the carriage to bring the wheels into operative position, these various axes conveniently being horizontal when the carriage is erected and standing on the said wheels.

The wheels may conveniently be mounted on panels which are hinged to the carriage and these panels may be adapted when in their collapsed position to meet and form a side of the case. Chassis units carrying the wheels, may be pivotally mounted adjacent edges of the panels which are inwardly directed towards or adjacent one another when the panels are in their collapsed position, and the wheels may be adapted to be on the inner faces of the panels when the carriage is thus collapsed. One or more channel members may be provided on each panel, adapted to interengage with corresponding channel members on the sides of the carriage to form box-section stiffening members of the erected carriage.

Where chassis units are provided as aforesaid, one locking device may be used for each such unit, actuation of which secures the unit to the carriage and holds the wheel or wheels carried therein, in operative position. This locking device may be provided with bolts adapted to be operated simultaneously through toggle levers out-

2 wardly extending from their articulation which is guided transversely of the levers, whilst the outer ends of the levers are guided longitudinally.

One or more rings of stiffening strip may be adapted to extend around the carriage when collapsed into the form of a case, such ring or each such ring including hinges whereby lid panels, e. g. panels carrying the wheels on their inner faces as aforementioned, are pivotally mounted on opposite sides of the carriage, and for fastening devices between the said lid panels whereby they can be held in their collapsed position and for locking means for securing the said lid panels to the sides of the carriage. The aforementioned interengaging channel members can conveniently also form part of this stiffening ring or of these stiffening rings.

An embodiment of the invention will now be described by way of example in fuller detail with reference to the accompanying drawings in which—

Figure 5 is a detail view drawn to a much larger scale of the locking mechanism for one of the lid panels and associated chassis unit with the bolts shown shot; whilst:

Figure 6 is a similar view to Figure 5 but showing the bolts withdrawn.

Figure 1:
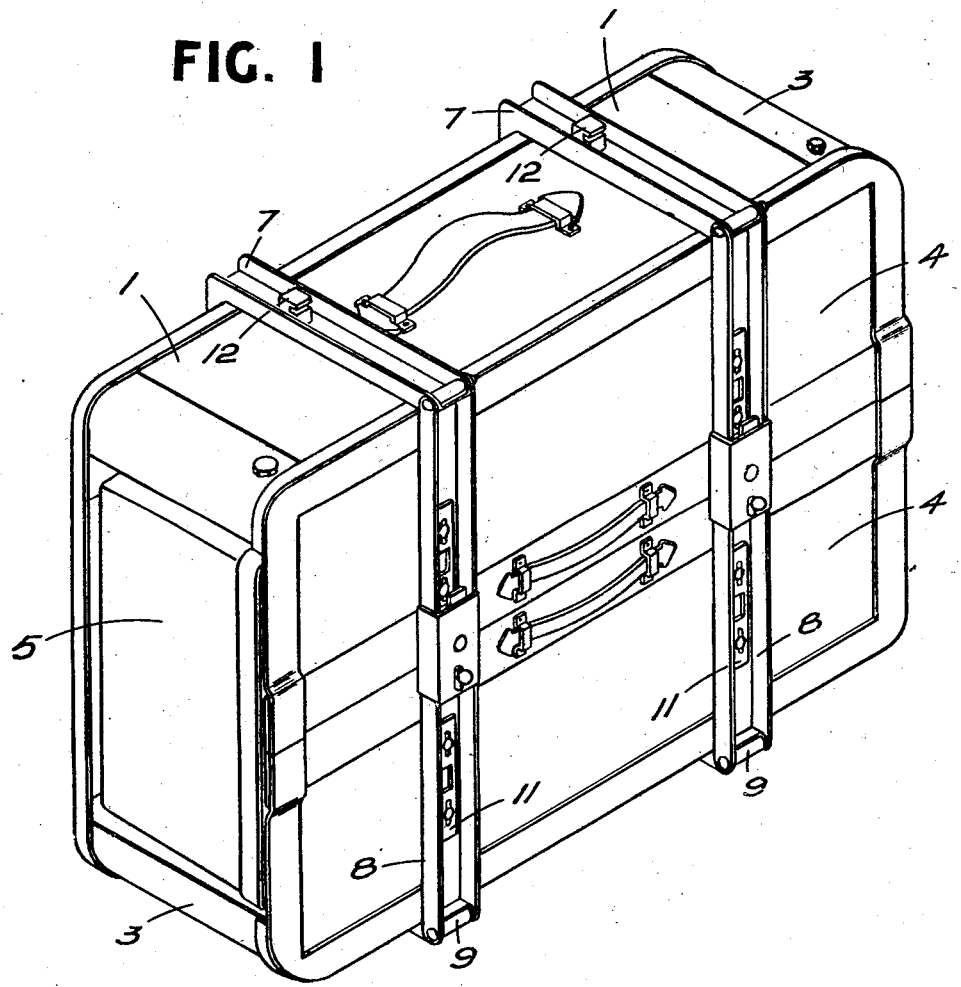
Figure 1 is a view of the carriage standing on edge completely collapsed into the form of a travelling case.

In the illustrated construction, the side walls 1 of the carriage body are made continuous with a similar wall 2 at the end of the body through rounded corners 3, the lid panels 4 adapted when in collapsed position to form one side of the case and the bottom adapted to form the other side being shaped to the resulting plan. The front wall 5 may be made relatively movable, but since neither this nor the collapsible handle 6 and associated interior fittings of the body which appear in the drawings, form part of the present invention, they will not be further described.

The lid panels 4 are made capable beneath them of entirely covering in the open top of the body, being hinged along the respective upper edges of the opposite side walls 1 and adapted to meet when closed inwardly together into their collapsed position. This hinging is also such as to permit the lid panels, when the carriage is to be erected, to be swung upwardly and outwardly away from one another and downwardly until they hang against the outer faces of side walls 1 and become in effect outer side panels of the carriage when they are locked in this operative position. Since that edge of each lid panel which is then lowermost becomes that which lies inwardly directed towards and adjacent the corresponding edge of the other panel when the panels are in collapsed position, chassis units carrying the road wheels are pivotally mounted on the panels as described later so that the units can be folded against the panels and the latter in turn swung over into the collapsed position, with the units preferably on the inner faces of the panels, as shown.

As will be seen from the drawings the top and bottom edge parts of the walls together with the corner parts are of metal to form a body framework which is completed by insertions of suitable light sheet material such as fibre board. The lid panels 4 are similarly constructed. The parts are shown stiffened by means of laterally separated rings of metal channel members, part 7 of each of which extends around the side walls 1 and bottom of the body, whilst parts 8 extend across the respective lid panels. These rings of channel members carry the hinges 9 whereby the lid panels are mounted on the top edges of the side walls 1 and also carry the fastening devices 10 whereby the said panels are held closed. Channel parts 8 are made wider than parts 7 so that when the lid panels are swung outwardly and downwardly against the side walls 1, the parts 8 are able to embrace parts 7 to form box-section vertical members of the carriage when erected. These channel stiffeners may also carry mounted thereon the vertically movable latching plates 11 (in the lid channels 8) and the hasp or stud members 12 (in the side wall channels 7) whereby the lid panels are locked to the side wall 1 in the manner hereinafter explained. Alternatively the channel parts 8 might be made narrower than channel parts 7 or both might be replaced by flat strips of the necessary strength, or a single stiffening ring only might be employed.

Figure 3:
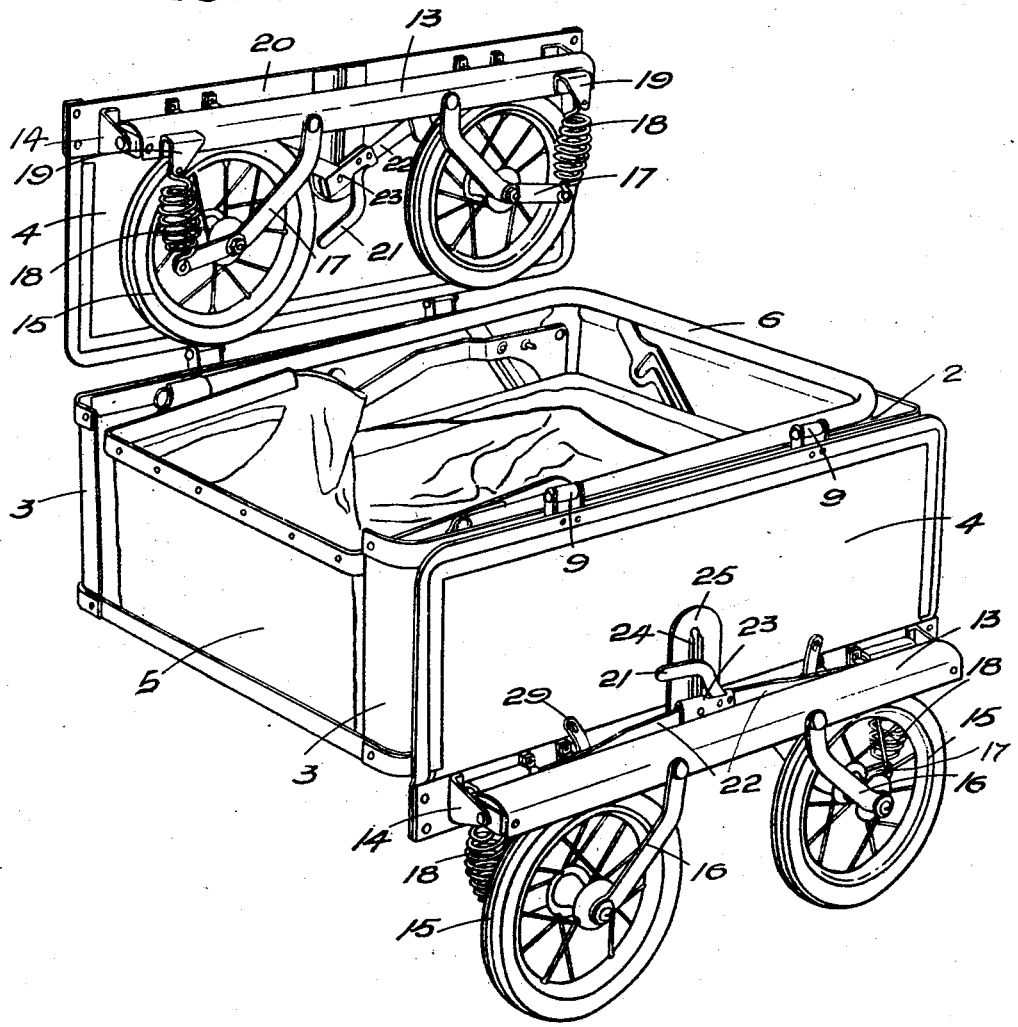
Figure 3 is a similar view to Figure 2 but with the near side lid panel swung down and its associated chassis unit extended, both being locked in operative position whilst the far side lid panel is shown in the same partly open position as is the near side one in Figure 2.
Figure 4:
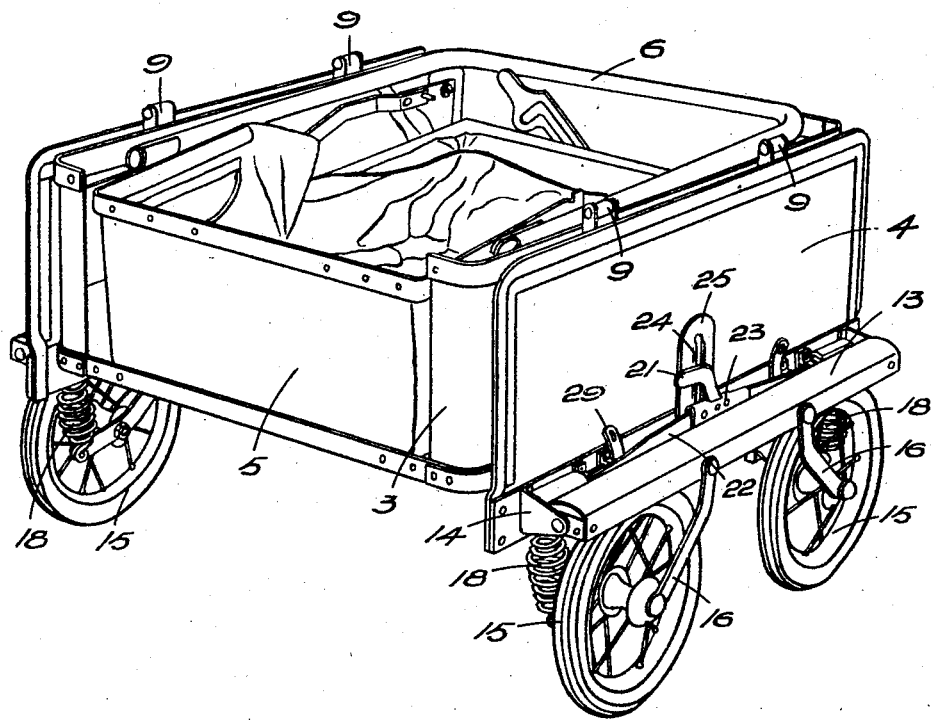
Figure 4 is a similar view but with both lid panels and their associated chassis units in operative position.

Each chassis unit comprises a frame 13 of metal strip covered by an inverted channel part forming a mudguard extending along the free edge of the associated lid panel 4 being pivotally mounted at its ends between spaced brackets 14 projecting from the face of the lid panel sufficiently to permit the free inward rotation of the frame 13 as the wheels are swung outwardly and upwardly. This pivotal axis extends longitudinally and symmetrically of frame 13 and lies also in the plane of the two wheels 15. The spindles of the latter are mounted below the frame between pairs of arms 16 and 17 pivoted at their upper ends to the frame 13 with the lower ends of the arms of the respective pairs forwardly and rearwardly directed. One arm 17 of each pair (most conveniently that which is on the inside when the chassis unit is extended down but outwardly facing when it is up as shown in both positions in Figure 3) projects beyond its associated wheel spindle bearing to act as a mounting for a coil compression spring 18 attached between such arm and a bracket 19 near the end of the frame 13.

Each of the lid panels 4 is seen to be at least as wide as the chassis unit, including wheels, which is mounted on it, is deep so that the unit can be brought into a position in which it lies against and within the width of the panel. In other words, the carriage body is at least twice as wide as each chassis unit, complete with wheels, is deep. The carriage body must also be at least of sufficient depth to accommodate the width of the chassis units lying within it on their sides supported from the panels. The free margins of the lid panels 4 are strengthened by means of plates 20 to carry the brackets 14 and locking gear to be described later.

The road wheels on opposite sides of the carriage are thus adapted to be swung about axes through the pairs of brackets 14 on the said sides respectively each of which axes is adapted to swing with the associated panel about a second axis through hinges 9 on its own side of the carriage to bring the wheels into operative position. Moreover in the illustrated construction all these various axes are horizontal when the carriage is erected and standing on the said wheels. It will be appreciated that each wheel might be mounted on a separate panel in the manner herein described and that there might be more than one panel on each side of the carriage.

Figure 2:
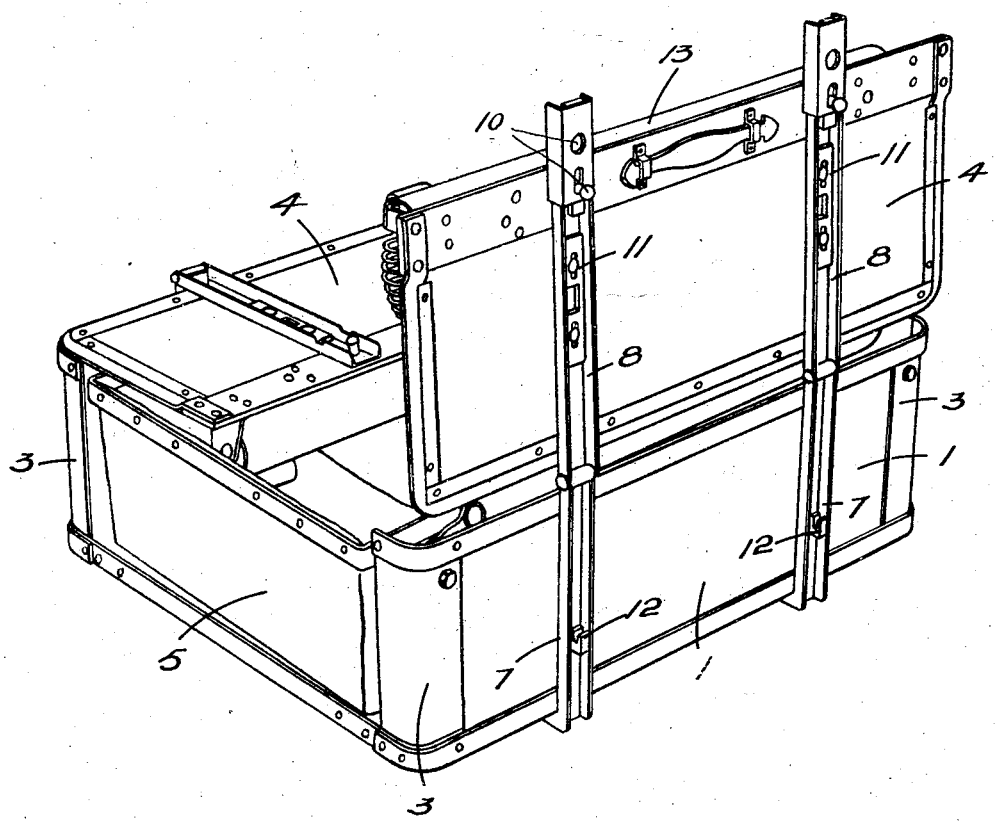
Figure 2 is a view of the case standing on its side face, i. e. that which will form the bottom of the erected carriage, and with the near side lid swung partly open, the far side one remaining in collapsed position.

The locking gear for securing each lid panel and consequently its associated chassis unit to the side of the body and holding the said chassis unit with its wheels in operative position is actuated from a single handle 21. The gear is best seen in Figures 5 and 6 because in the other figures it is largely hidden behind the chassis frames 13 between which and plate 20 of each of the lid panels, it is located. Essentially the gear comprises a pair of oppositely directed generally horizontal toggle levers 22 of one of which the handle 21 is an extension. These levers are articulated together adjacent the handle by means of a coupling member 23 associated with a block which is movable up and down slot 24 in a guide plate 25 of the lid panel 4 which plate is arranged transversely across the marginal plate 20. At the outer ends of levers 22 are pivoted bolts 26 adapted to engage the aforementioned brackets 19 projecting from the inner side of the chassis frame 13. Guides 27 and 28 on plate 20 are so disposed that when handle 21 is pressed fully down to the position shown in Figure 5, bolts 26 are projected horizontally into locking engagement with brackets 19 whilst when the handle is lifted to the position shown in Figure 6, these bolts are withdrawn to release the said brackets leaving the chassis unit free to turn. The brackets 19 which are of inverted U form should be sufficiently robust and be engaged by the bolts 26 sufficiently tightly to provide the necessary lateral rigidity of the chassis units when extended. The movement of levers 22 already described also serves to actuate the aforementioned latching plates 11 working in channels 8 on the opposite face of the lid panel 4, through links 29 which are connected by pins 30 through slots in the lid panel, with the said plates 11. In the Figure 6 position of the handle it will be seen that the hole in each plate 11 can be freely passed over the associated hasp or stud member 12 to which it can then be locked through the edge of the hole engaging an undercut (shown clearly in Figures 1 and 2) of member 12 as the parts are moved to the Figure 5 position in which the lid panel is secured to the side of the body.

One or more suit-case or trunk handles of the usual kind may be provided on surfaces which are outside when the carriage is collapsed, preferably as shown in the drawings.

We claim:

1. A collapsible carriage of the type forming a portable case when collapsed comprising, a body portion, lid panels at opposite sides of said body portion, wheels for supporting the opposite sides of the carriage secured to the lid panels and mounted so as to be swung upwardly away from one another and downwardly to be brought into operative position, metal stiffening means forming a ring around the exterior of said body portion when the carriage is collapsed, said ring including hinges whereby said lid panels are pivotally mounted to the opposite sides of said body portion, fastening devices whereby said lid panels can be secured in their collapsed position, and locking means for securing said lid panels to the sides of the body portion when in extended position.

2. A collapsible carriage having a body portion in the form of a receptacle with lid panels hinged to opposite side walls and adapted to meet at the middle of the receptacle when the carriage is collapsed, characterized by wheels pivotally mounted on the inside of the lid panels adjacent the free edge thereof so that said wheels may be swung toward the panel hinge to lie against the inner faces of the panels and within the receptacle when the carriage is collapsed, and when the panels are opened and swung into a position along side the walls of the receptacle, said wheels may be swung over their hinged axes into the position of use.

3. A collapsible carriage having a body portion, lid panels hinged to opposite sides of the body portion, and wheels mounted on the panels in such manner that when the carriage is collapsed the wheels are enclosed within the body portion, characterized by chassis units mounting the wheels, said chassis units being pivotally mounted adjacent the edge of the lid panel remote from the panel hinges so that the wheels are brought into operative position from their flat position against the panels by swinging them through approximately 180°.

4. A collapsible carriage as claimed in claim 3, wherein said chassis units are mounted on the panels by trunnions pivotally mounted in brackets projecting from the panels.

5. A collapsible carriage as claimed in claim 3 including locking means whereby said chassis units are locked in the operative position.

6. A collapsible carriage as claimed in claim 3 including a locking means for locking said chassis units in the operative position, a locking means for locking the lid panels against the side walls of the body portion when the lid panels are moved to the extended position, and common means for causing both said locking means to move into and out of locking position.

7. A collapsible carriage as claimed in claim 3, including bolts adapted to engage said chassis unit, and toggle levers connected to said bolts and being operable to move said bolts into engaging position to lock said chassis unit in operative position.

8. A collapsible carriage as claimed in claim 3, including stiffening members provided on each panel and on the side walls of the body portion, and means for interconnecting said stiffening members to stiffen the carriage structure when it is in operative position.

9. A collapsible carriage comprising a body portion, lid panels hinged to opposite sides of the body portion, wheels pivotally mounted on said lid panels and adapted when the carriage is collapsed to be enclosed within said body portion, channel members provided on each panel, and corresponding channel members provided on the side walls of said body portion, both said channel members being adapted to inter-engage to form box-like stiffening members when said lid panels are moved to their extended position against the said walls of said body portion.

10. A collapsible carriage as claimed in claim 1, including locking means for locking said channel members on said panels to said channel members on said side walls.

LEONARD COOKLIN.
THOMAS ROY HOLLIS.

REFERENCES CITED

The following references are of record in the file of this patent:

UNITED STATES PATENTS

| Number | Name | Date |
|---|---|---|
| 955,783 | Folgeman et al. | Apr. 19, 1910 |